(12) United States Patent
Yang et al.

(10) Patent No.: US 9,681,206 B2
(45) Date of Patent: Jun. 13, 2017

(54) SENSING DEVICE AND GROUPING METHOD

(71) Applicants:HON HAI PRECISION INDUSTRY CO., LTD., New Taipei (TW); SOCLE TECHNOLOGY CORP., Hsinchu (TW)

(72) Inventors: Wei-Wen Yang, New Taipei (TW); Yu-Shu Chen, New Taipei (TW); Ming-Hsi Tsai, New Taipei (TW); Yu-Cheng Chen, New Taipei (TW)

(73) Assignees: HON HAI PRECISION INDUSTRY CO., LTD., New Taipei (TW); SOCLE TECHNOLOGY CORP., Hsinchu (TW)

( * ) Notice: Subject to any disclaimer, the term of this patent is extended or adjusted under 35 U.S.C. 154(b) by 16 days.

(21) Appl. No.: 14/793,208

(22) Filed: Jul. 7, 2015

(65) Prior Publication Data

US 2016/0277815 A1    Sep. 22, 2016

(30) Foreign Application Priority Data

Mar. 18, 2015    (TW) .............................. 104108547 A (51) Int. Cl.
*H04W 84/18*    (2009.01)
*H04Q 9/00*    (2006.01)

(52) U.S. Cl.
CPC .............. *H04Q 9/00* (2013.01); *H04W 84/18* (2013.01); *H04Q 2209/43* (2013.01); *H04Q 2209/883* (2013.01)

(58) Field of Classification Search
CPC .................................................... H04W 84/18
See application file for complete search history.

(56) References Cited

U.S. PATENT DOCUMENTS

| | | | | |
|---|---|---|---|---|
| 7,119,676 B1 * | 10/2006 | Silverstrim | ............ | G01D 21/00 340/506 |
| 7,937,167 B1 * | 5/2011 | Mesarina | .............. | H04W 8/186 340/870.11 |
| 8,536,988 B2 * | 9/2013 | Ritter | ..................... | H04W 88/04 340/286.02 |
| 2003/0012168 A1 * | 1/2003 | Elson | ..................... | G01D 9/005 370/338 |
| 2005/0099438 A1 * | 5/2005 | Lester | .................. | B41J 13/0009 347/4 |

* cited by examiner

*Primary Examiner* — Andrew Bee
(74) *Attorney, Agent, or Firm* — Steven Reiss (57) ABSTRACT

A grouping method for a sensing device is provided. The sensing device includes a sensor, a processor, storage and a communication device controlled by the processor. The method includes: inquiring the sensing device's sensing function, supported network types; exchanging the inquired information with other sensing devices having a same sensing function and in networks of same supported network types; forming a function group based on a pre-defined first rule, and exchanging first configuration parameters within the function group; designating one of the sensing devices of the group a master sensing device, and rest of the group slave sensing device(s) based on the exchanged first configuration parameters and a pre-defined second rule; and controlling the master sensing device's the communication device to receive operation parameters and commands from a device outside the function group and relaying the operation parameters and commands to the rest of the function group.

18 Claims, 10 Drawing Sheets

301 inquire the sensing device's sensing function, supported network types

302 interact with one or more sensing devices in networks of the supported network types, share the sensing function with the one or more sensing devices, and acquire the one or more sensing devices' sensing functions

303 form a function group by grouping the sensing device with at least one of the one or more sensing devices that have the same sensing function as the sensing device's sensing function based on a pre-defined first rule and through interaction with the one or more sensing devices, and exchange first configuration parameters of the sensing devices within the function group

304 designate one of the sensing device of the function group a master sensing device and rest of the group slave sensing device(s), based on the exchanged first configuration parameters and a pre-defined second rule

305 control the communication device to receive operation parameters and commands from a device outside the function group and relay the operation parameters and commands to the rest of the function group, upon a condition that the sensing device is the master sensing device

306 set operation parameters of the sensor according to the operation parameters, operate the sensor according to the commands, and control the communication device to send sensed information by the sensor to a server

701 — interact with each other within available networks of supported network types and exchange its sensing function with each other

702 — select one of the available networks of supported network types based on a pre-defined first rule and interact with each other within the selected network to form a function group and exchange its first configuration parameters with each other within the function group

703 — designate one of the sensing device of the function group a master sensing device and rest of the group slave sensing device(s), based on the exchanged first configuration parameters and a pre-defined second rule

704 — master sensing device receive operation parameters and commands from a device outside the function group and relay the operation parameters and commands to the rest of the function group

705 — set its operation parameters according to the operation parameters, operate the sensor according to the commands, and send sensed information by the sensor to a server

901 — interact with master sensing device(s) of other function group(s) having a same function distributed in a different network to form an aggregation of function groups, share its second configuration parameters to the master sensing device(s) of other function group(s) of the aggregation, and obtain second configuration parameters of the master sensing device(s) of other function group(s) of the aggregation 902 — designate one of the function groups a master function group, and rest of the aggregation slave function group(s), based on the exchanged second configuration parameters and a pre-defined second rule 903 — receive operation parameters and commands from the master sensing device of the master function group of the aggregation, and relays the operation parameters and commands to the rest of the aggregation, upon a condition that the sensing device is the master sensing device of the master function group 904 — receive operation parameters and commands from a device outside the aggregation, upon a condition that the sensing device is the master function group of one of the slave function group

1001: interact with master sensing device(s) of other function group(s) having a same function distributed in available networks of supported network types to form an aggregation of function groups, share its second configuration parameters to the master sensing device(s) of other function group(s) of the aggregation, and obtain second configuration parameters of the master sensing device(s) of other function group(s) of the aggregation

1002: designate one of the function groups a master function group, and rest of the aggregation slave function group(s), based on the exchanged second configuration parameters and a pre-defined second rule

1003: receive operation parameters and commands from a device outside the aggregation and relays the operation parameters and commands to the rest of the aggregation, upon a condition that the Sensing device is the master sensing device of the master function group of the aggregation

1004: receive operation parameters and commands from the master sensing device of the master function group of the aggregation, upon a condition that the sensing device is the master sensing device of one of the slave function groups

FIG. 10

SENSING DEVICE AND GROUPING METHOD

FIELD

The subject matter herein generally relates to communication technology, especially relates to a sensing device and a grouping method for grouping a plurality of sensing devices.

BACKGROUND

Smart sensing devices are widely used on various electronic devices. Sometimes transmission of sensed information by the sensors needs to base on available networks. Sometimes in order for accuracy of sensing information, more than one sensor can be employed. In order for low energy consumption, there is a need for a grouping method which can effectively group a plurality of sensors and establish effective communications among those sensors and communications between the sensors and an external device.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series and the like.

Figure 1:
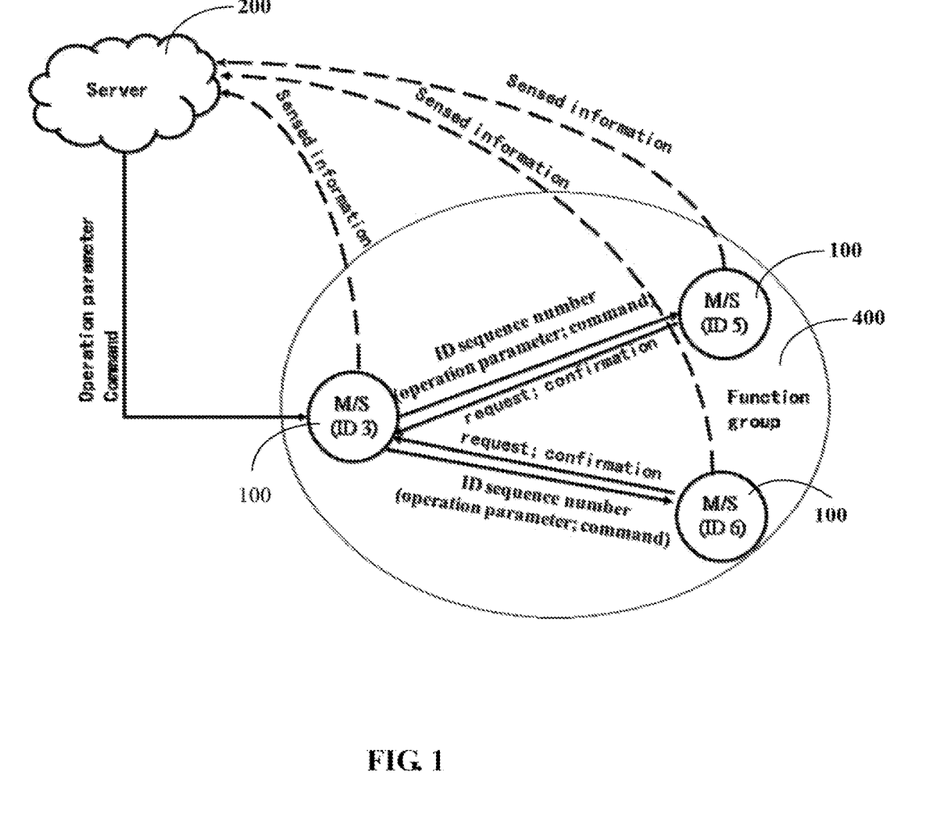
FIG. 1 is a diagrammatic view of an exemplary embodiment of a function group consisting of a plurality of sensing devices.

FIG. 1 illustrates diagrammatic view of an exemplary embodiment of a function group 400 consisting of a plurality of sensing devices 100. In the example embodiment, the sensing devices 100 can communicates with each other over at least one available communication networks (not shown). In at least one example embodiment, the sensing devices 100 can communicates with a server 200 over at least one available communication networks. In at least one embodiment, the server 200 can be any device capable of communicating with the sensing devices 100, for example, a personal computer. The communication networks can include, but not limited to, any conventional wired network, wireless network and the both. The wireless network can be any category of conventional wireless communications, for example, radio, Wireless Fidelity (WiFi), cellular, satellite, and broadcasting. Exemplary suitable wireless communication technologies comprise, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT) and others.

The server 200 can be a cloud server. Each of the sensing devices 100 can be a part of an electronic device such as a wearable electronic device and a portable electronic device, or independent from the electronic device.

Figure 2:
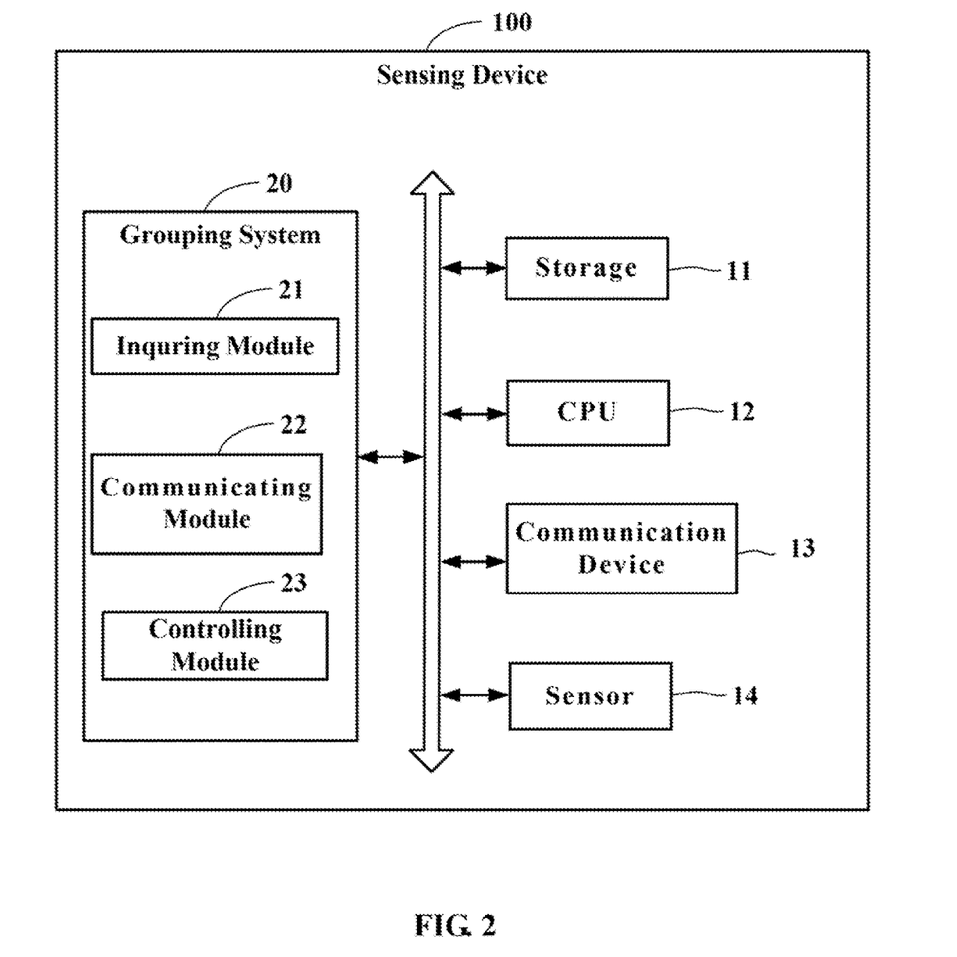
FIG. 2 is a block diagram of an exemplary embodiment of a sensing device.

Referring to FIG. 2, a diagrammatic block diagram of a sensing device is illustrated. The sensing device 100 can include a storage 11, a central processor unit (CPU) 12, a communication device 13, and a sensor 14. The storage 11 can be an internal storage unit of the sensing device 100, for example, a hard disk or memory, or a pluggable memory, for example, Smart Media Card, Secure Digital Card, Flash Card. In at least one embodiment, the storage 11 can include two or more storage devices such that one storage device is an internal storage unit and the other storage device is a pluggable memory. The storage 11 can be configured to store a profile of the sensing device 100, including configuration parameters, sensing function, and supported network types of the sensing device 100. The communication device 13 can be configured to communicate with other sensing device and the server 200.

Although shown in FIG. 2 and described as a CPU for purposes of illustration only, in at least one example embodiment, the CPU 12 can be a microprocessor, or other data processor chip that performs functions of the sensing device 100.

A grouping system 20 can include computerized instructions in the form of one or more programs that can be executed by the CPU 12. In the embodiment, the grouping system 20 can be integrated in CPU 12. In at least one embodiment, the grouping system 20 can be independent from the CPU 12 and can be stored in the storage 11 and coupled to the CPU 12. The system 20 can include one or more modules, for example, an inquiring module 21, a communicating module 22, and a controlling module 23. A "module," as used herein, refers to logic embodied in hardware or firmware, or to a collection of software instructions, written in a programming language, such as, JAVA, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

The inquiring module 21 can be configured to inquire configuration parameters stored in the storage 11 of the sensing device 100. The communicating module 22 can be configured to communicating with a device over available networks. The controlling module 23 can be configured to control the sensing device to interact with other sensing device in a network of supported network types, group the sensing device with one or more other sensing devices having a same function to form a function group, designating one of the sensing devices of the function group a master sensing device and rest of the function group slave sensing device(s), receive operation parameters and commands from a device outside the function group and relay the received operation parameters and commands to the slave sensing device(s) of the function group. The controlling module further configured to control the sensing device to set operation parameters based on the received operation parameters, operate the sensor according to the commands, and sending sensed information by the sensors to a server. The controlling module further configured to control the sensing device to receive an analysis result of the sensed information from the serve and display analysis result on a display. In at least one embodiment, upon a condition that the sensing device is the master sensing device of a function group, the controlling module further configured to control the sensing device to interact with other function group in different networks to form an aggregation of function group, designate a master function group of the aggregation and rest of the aggregation slave function group(s) based on a pre-defined second rule. Upon a condition that the sensing device is the master sensing device of the master function group, the controlling module further configured to control the sensing device to receive operation parameters and commands from a device outside the aggregation and then to relay the operation parameters and commands to the master sensing device(s) of the slave function group(s) of the aggregation. Upon a condition that the sensing device is the master sensing device of one of the slave function group(s), the controlling module further configured to control the sensing device to receive operation parameters and commands from the master sensing device of the master function group of the aggregation.

Figure 3:
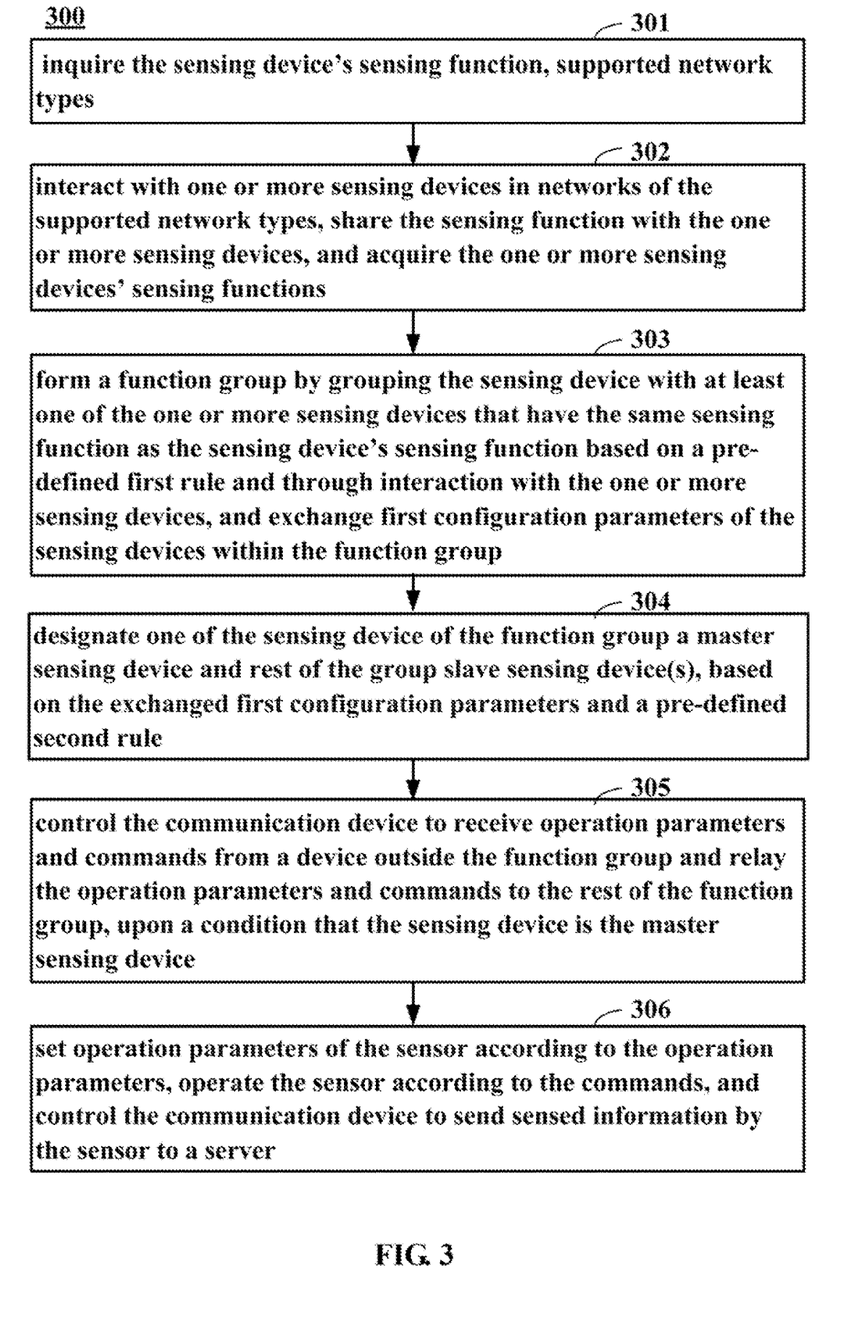
FIG. 3 is a flowchart of an exemplary embodiment of a grouping method.

Referring to FIG. 3, a flowchart is presented in accordance with an example embodiment which is being thus illustrated. The example method 300 is provided by way of example, as there are a variety of ways to carry out the method. The method 300 described below can be carried out using the configurations illustrated in FIGS. 1-2, for example, and various elements of the figures is referenced in explaining example method 300. Each block shown in FIG. 3 represents one or more processes, methods or subroutines, carried out in the exemplary method 300. Furthermore, the illustrated order of blocks is by example only and the order of the blocks can change according to the present disclosure. Additional blocks may be added or fewer blocks may be utilized, without departing from this disclosure. The exemplary grouping method 300 is illustrated in FIG. 3. The exemplary method 300 can be executed by a sensing device and can begin at block 302. The sensing device can include a sensor configured to sense related information, a communication device configured to communicate with other sensing devices and/or outside devices, and a storage configured to store related information.

At block 301, the sensing device inquires the sensing device's sensing function, supported network types.

At block 302, the sensing device interacts with one or more sensing devices in available networks of the supported network types, shares the sensing function with the one or more sensing devices, and acquires the one or more sensing devices' sensing functions. In one exemplary embodiment, the available networks can include at least one type of networks. For example, the sensing device 100 supports a plurality of network types such as Bluetooth, Wi-Fi, and telecommunication networks, and currently available networks include Bluetooth, ZigBee, and third generation (3G) or fourth generation (4G) of mobile telecommunications technology wireless networks. Therefore, the sensing device 100 can interact with other sensing devices over Wi-Fi and 3G.

At block 303, the sensing device forms a function group by grouping the sensing device with at least one of the one or more sensing devices that have the same sensing function as the sensing device's sensing function based on a pre-defined first rule and through interaction with the one or more sensing devices, and exchanges first configuration parameters of the sensing device with other sensing devices within the function group. In at least one exemplary embodiment, the sensing device stores the first configuration parameters of other sensing devices into the storage of the sensing device.

Referring to FIG. 1, a plurality of sensing devices (M/S) 100 having a same sensing function, for example, temperature sensing, or distance sensing, can form a function group within a same network.

Figure 4:
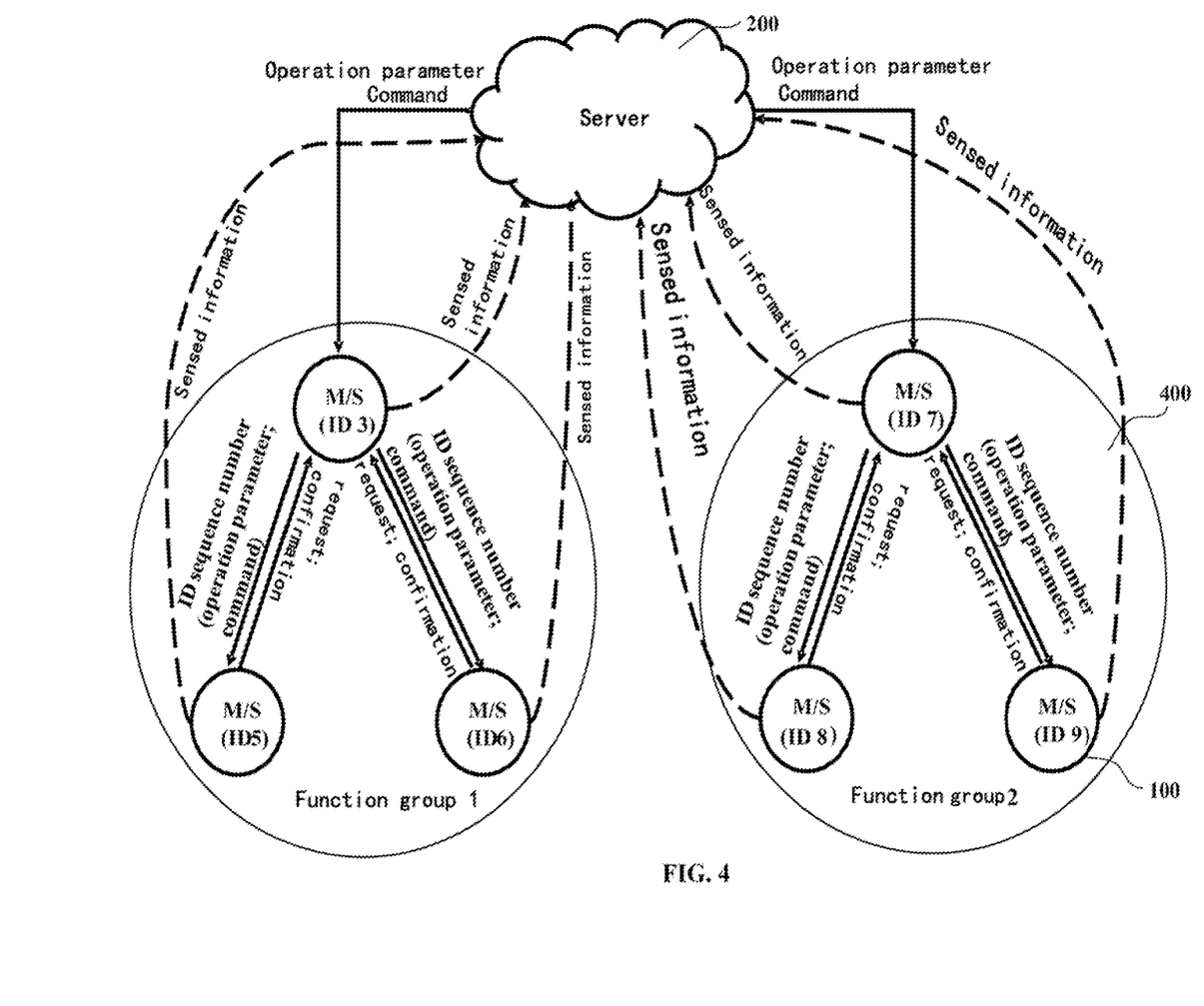
FIG. 4 is a diagrammatic view of an exemplary embodiment of at least two function groups, each function group consisting of a plurality of sensing devices.

Referring to FIG. 4, a plurality of sensing devices (M/S) 100 having a same sensing function dispersed in different networks can form more than one function group having a same sensing function in different networks. In another exemplary embodiment, a plurality of sensing devices (M/S) 100 having a different sensing function within a same network can form a plurality of function groups having different sensing functions within a same network.

In the exemplary embodiment, the pre-defined first rule can be: when the sensing devices having the same sensing function are distributed in two or more networks of the supported types, choosing those with lower energy consumption, shorted distance and better network route to form the function group.

In the exemplary embodiment, if the sensing device cannot find any other sensing devices having the same sensing function in available networks of supported types, the sensing device will shut down itself automatically.

At block 304, the sensing device designates one of the sensing device of the function group a master sensing device, and rest of the group slave sensing device(s), based on the exchanged first configuration parameters and a pre-defined second rule. Each slave sensing device sends to the master sensing device requests and confirmation of a network node.

For example, the sensing device marks each sensing device in the function group with a mark "master" or "slave", which is written into configuration parameters of each sensing device. The configuration parameters of each sensing device are stored in the storage of the sensing device. In an exemplary embodiment, the configuration parameters of each sensing device can include the identifier of each sensing device which can be a universally unique identifier (QUID). The pre-defined second rule can be: designating the one of the sensing devices with the lowest sequence number in its identifier as the master sensing device.

In another exemplary embodiment, the configuration parameters of each sensing device can include processing capability of each sensing device. The pre-defined second rule can be: designating the one of the sensing devices with the highest processing capability as the master sensing device.

At block 305, the sensing device controls the communication device to receive operation parameters and commands from a device outside the function group such as a server and relays the received operation parameters and commands to the rest of the function group, upon a condition that the sensing device is the master sensing device. In at least one embodiment, the device outside the function group can be a server.

At block 306, the sensing device sets operation parameters of the sensor according to the received operation information, operates the sensor according to the commands and controls the communication device to send sensed information by the sensor to the server. In the same way, as illustrated in FIG. 1, the other sensing devices within the function group sets operation parameters of their sensors according to the received operation information, operate their sensor according to the commands and control their communication devices to send sensed information by the sensor to the server.

In at least one exemplary embodiment, the operation parameters can include a sensing range, a working frequency and start conditions.

In at least one exemplary embodiment, the server can send information such as analysis result based on the received sensed information to the master sensing device. In at least one exemplary embodiment, the master sensing device can include a display configured to display the analysis result thereon.

In at least one embodiment, the server can calibrate operation parameters of the sensing devices according to the received sensed information from the sensing devices. The calibrated operation parameters are then sent to the master sensing device which relays the calibrated operation parameters within the function group.

In at least one embodiment, the server can send commands according to the analysis result to cause one or more sensing devices to enter into a sleep mode, and/or to cause one or more sensing devices to wake up from a sleep mode.

For example, if sensed information from a sensor is distinctly different from other sensing devices in a same function group, the server can determine that the sensor having different sensed information is in an abnormal condition and send a command to cause the sensing device having different sensed information to enter into a sleep mode, so as to reduce energy consumption of the function group.

In at least one exemplary embodiment, each sensing device can stores received operation parameters and commands into its storage, therefore, each sensing device can rapidly restore their operations as soon as connectivity to the network is restored.

Figure 5:
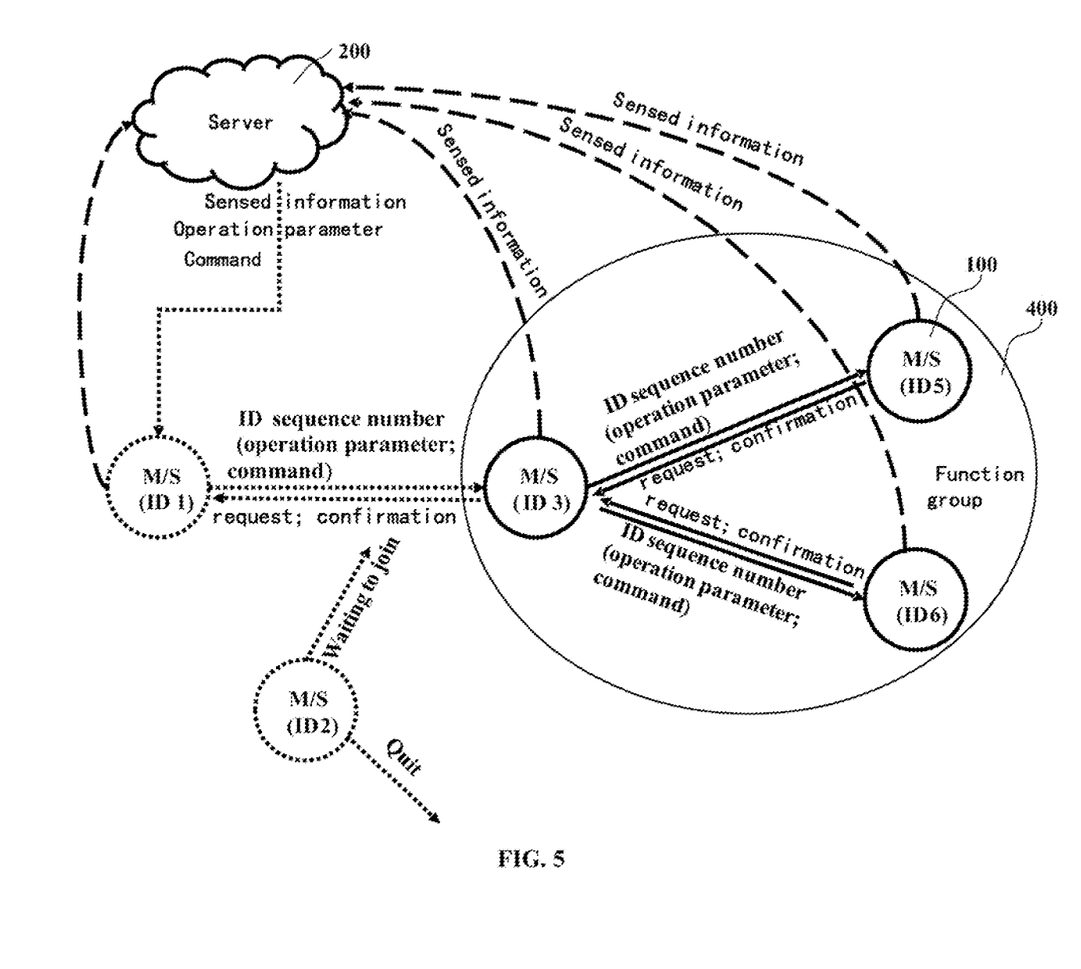
FIG. 5 is a diagrammatic view of an exemplary embodiment of a function group with a sensing device joining in and/or quitting.

Referring to FIG. 5, when a relationship among the sensing devices within a function group is changed, for example, the mater sensing device is in the sleep mode or not longer part of the function group, one or more sensing devices join the function group or one or more sensing devices of the function group are awakened from the sleep mode, the sensing device can re-group current available sensing devices and designate one of the available sensing devices as mater sensing device according to the pre-defined second rule. If only one or more slave sensing devices enter into the sleep group, and/or are awakened from the sleep mode, rest of the sensing devices in the function group can remain their current operation.

Figure 6:
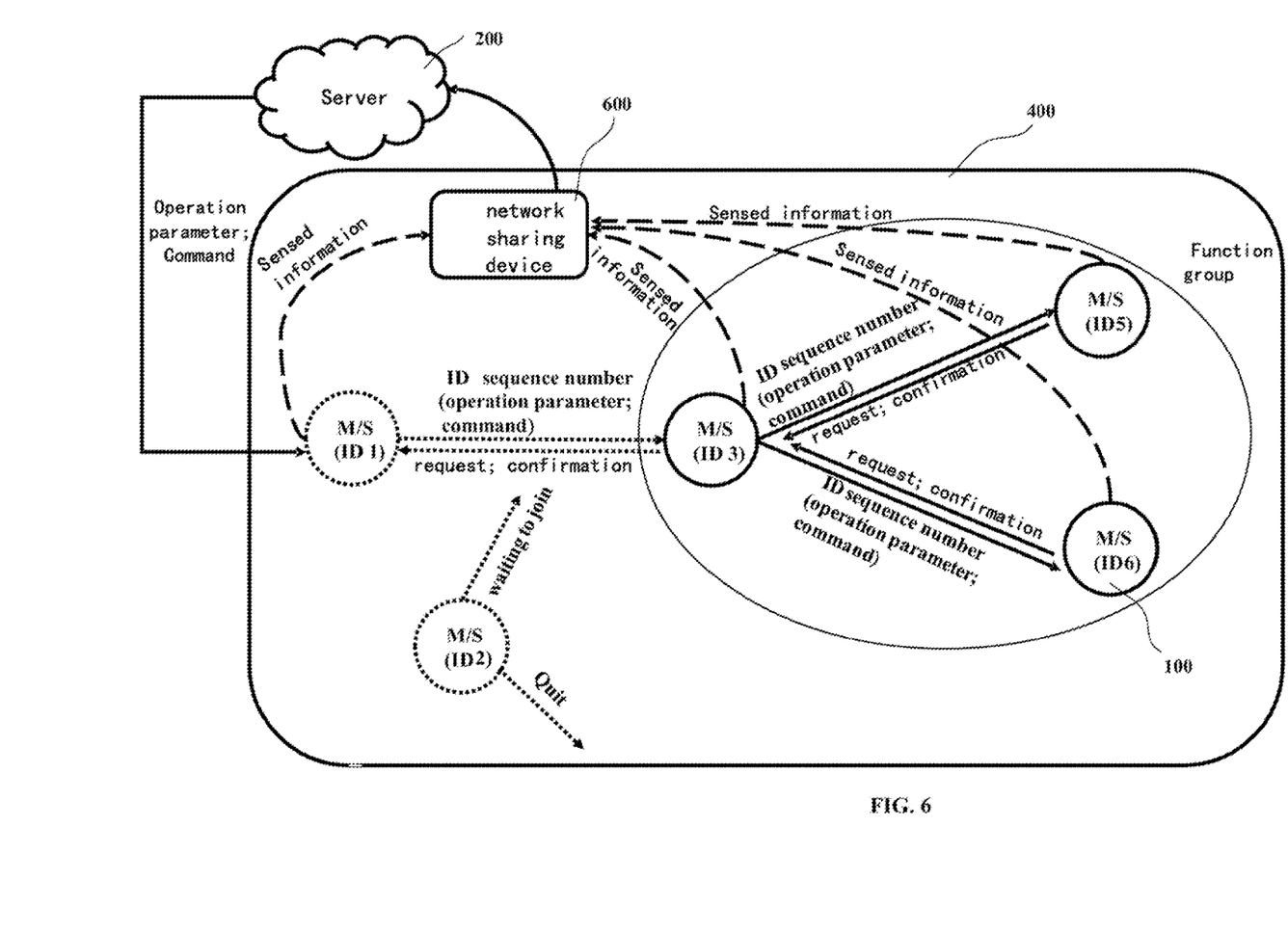
FIG. 6 is a diagrammatic view of an exemplary embodiment of a function group sending sensed information to a server.

Referring to FIG. 6, the sensing device can send the sensed information directly or through a network sharing device 600, for example, a router, to the server.

Figure 7:
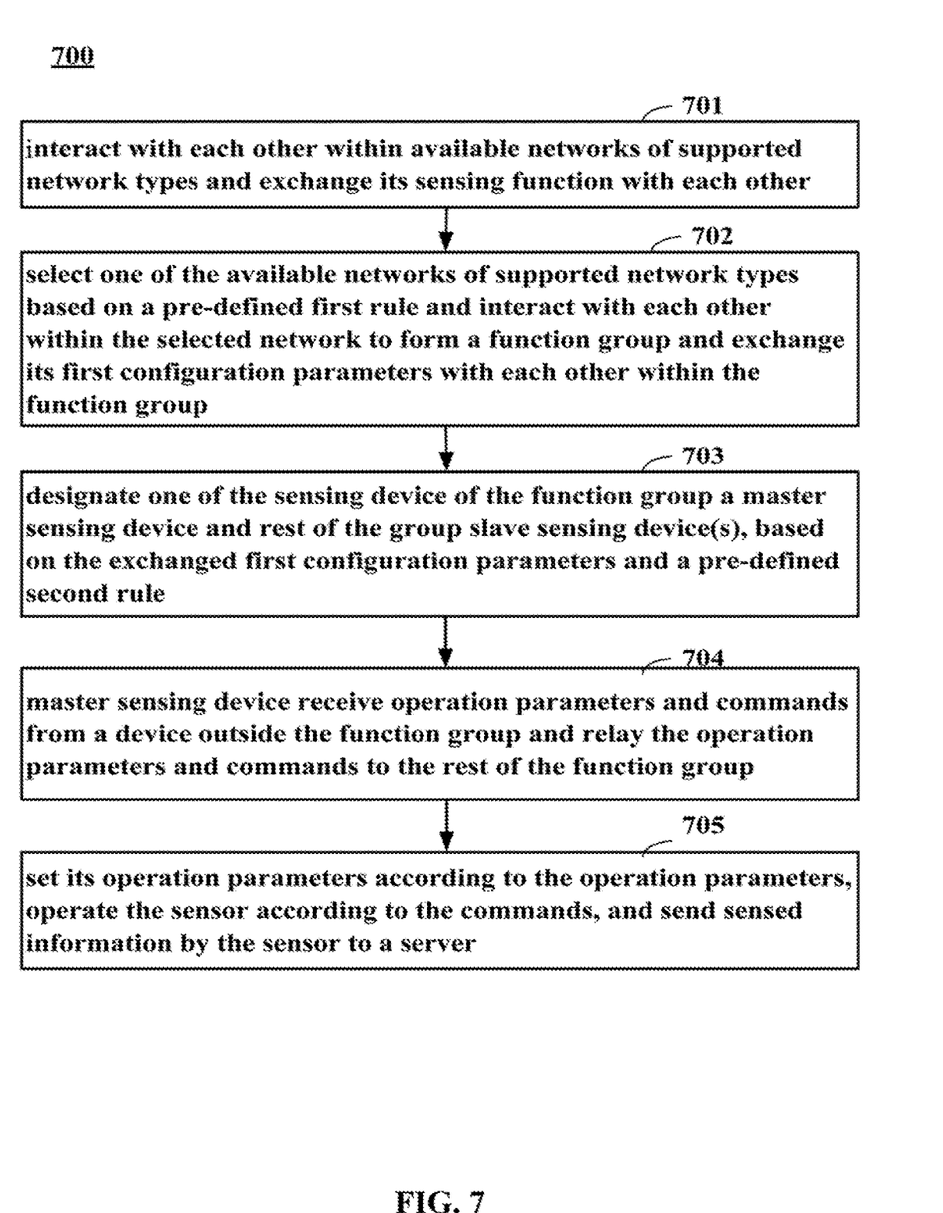
FIG. 7 is a flowchart of another exemplary embodiment of a grouping method.

Referring to FIG. 7, a flowchart of another exemplary embodiment of a grouping method is illustrated. The example method 700 is provided by way of example, as there are a variety of ways to carry out the method. The method 700 described below can be carried out using the configurations illustrated in FIGS. 1-2, 4-6, for example, and various elements of the figures is referenced in explaining example method 700. Each block shown in FIG. 7 represents one or more processes, methods or subroutines, carried out in the exemplary method 700. Furthermore, the illustrated order of blocks is by example only and the order of the blocks can change according to the present disclosure. Additional blocks may be added or fewer blocks may be utilized, without departing from this disclosure. The exemplary grouping method 700 is illustrated in FIG. 7. The exemplary method 700 can be executed by one or more sensing devices and can begin at block 701. Each one of the one or more sensing devices can include a sensor configured to sense related information, a communication device configured to communicate with other sensing devices and/or outside devices, and storage configured to store its configuration parameters, sensing function, and supported network types.

At block 701, each one of the one or more sensing devices interacts with each other over available networks of supported network types and exchanges its sensing function with each other. The available networks of supported network can include one or more networks of same or different type.

At block 702, each one of the one or more sensing devices selects one of the available networks of supported network types based on a pre-defined first rule and interacts with each other within the selected network to form a function group, and exchanges its first configuration parameters with each other within the function group. The pre-defined first rules can be determined in a same way with method 300.

At block 703, each one of the one or more sensing devices designates one of the sensing devices of the function group a master sensing device and rest of the group slave sensing device(s), based on the exchanged first configuration parameters and a pre-defined second rule. The pre-defined second rules can be determined in a same way with method 300.

At block 704, the master sensing device of the function group receives operation parameters and commands from a device outside the function group and relays the operation parameters and commands to the rest of the function group At block 705, each one of the one or more sensing devices sets its operation parameters according to the operation parameters, operates its sensor according to the commands, and sends sensed information by its sensor to a server.

Figure 8:
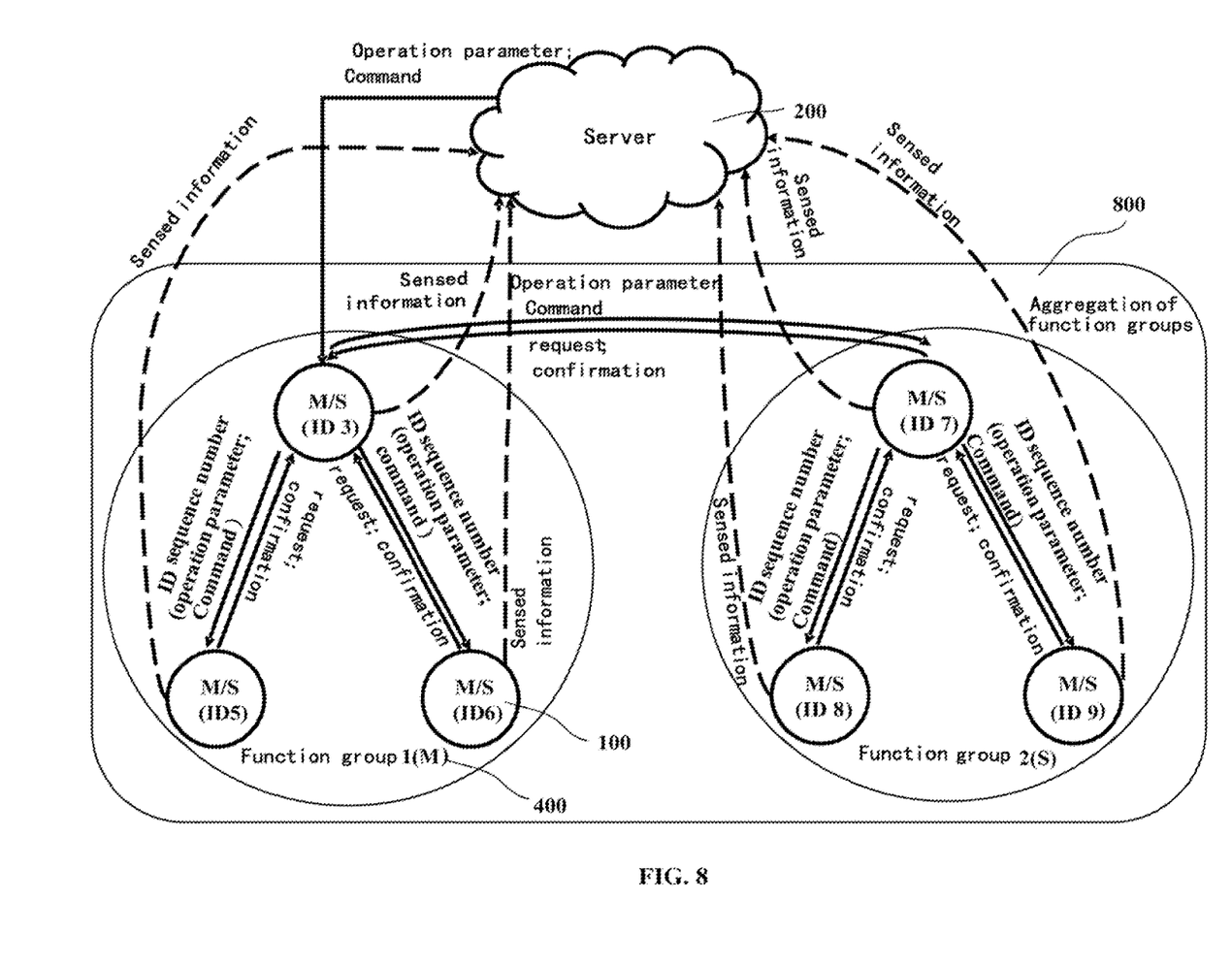
FIG. 8 is a diagrammatic view of an exemplary embodiment of aggregation of function groups consisting of at least two function groups.

Referring to FIG. 8, a diagrammatic view of an exemplary embodiment of aggregation of function groups consisting of at least two function groups is illustrated. In the exemplary embodiment, sensing devices having a same sensing function distributed in different networks can form an aggregation 800 of function groups. Like a single function group, the aggregation 800 can designate one of the function groups a master function group and rest of the function groups slave function group(s). The server 200 can send operation parameters and commands to the master function group and then the master function group can relay the operation parameters and commands received from the server to slave function group(s) of the aggregation 800.

Figure 9:
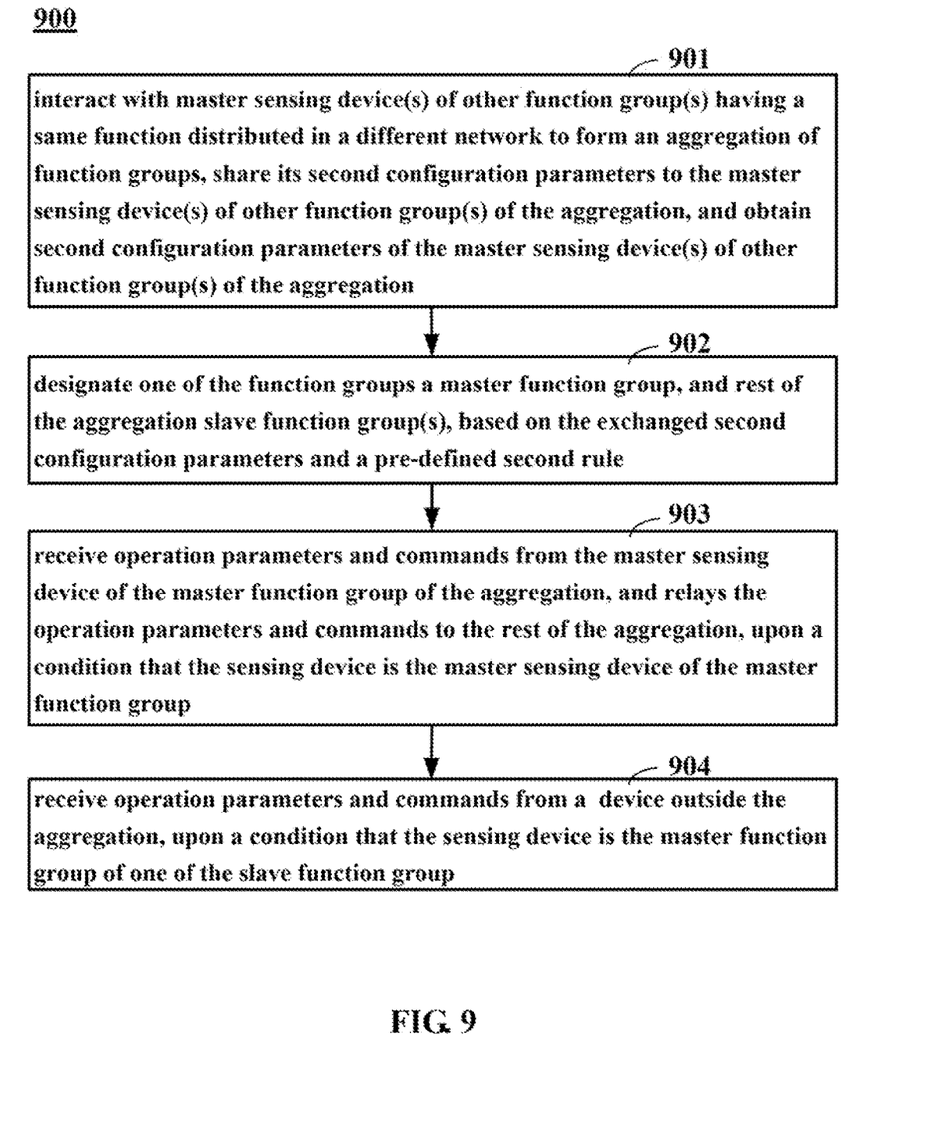
FIG. 9 is a flowchart of an exemplary embodiment of an aggregating method.

Referring to FIG. 9, a flowchart of an exemplary embodiment of an aggregating method is illustrated. The example method 900 is provided by way of example, as there are a variety of ways to carry out the method. The method 900 described below can be carried out using the configurations illustrated in FIGS. 1-2, 4-6, 8, for example, and various elements of the figures is referenced in explaining example method 900. Each block shown in FIG. 9 represents one or more processes, methods or subroutines, carried out in the exemplary method 900. Furthermore, the illustrated order of blocks is by example only and the order of the blocks can change according to the present disclosure. Additional blocks may be added or fewer blocks may be utilized, without departing from this disclosure. The exemplary aggregating method 900 is illustrated in FIG. 9. The exemplary method 900 can be executed by a sensing device and can begin at block 901. The sensing device can include a sensor configured to sense related information, a communication device configured to communicate with other sensing devices and/or outside devices, and storage configured to store its configuration parameters, sensing function, and supported network types.

At block 901, the sensing device interacts with master sensing device(s) of other function group(s) having a same function distributed in a different network from the sensing device to form an aggregation of function groups by grouping the function group to which the sensing device belongs with one or more other function groups having the same sensing function in a different network from the function group to which the sensing device belongs, shares its second configuration parameters to the master sensing device(s) of other function group(s) of the aggregation, and obtains second configuration parameters of the master sensing device(s) of other function group(s) of the aggregation, upon a condition that the sensing device is the master sensing device of a function group.

At block 902, the sensing device designates one of the function groups a master function group, and rest of the aggregation slave function group(s), based on the exchanged second configuration parameters and a pre-defined second rule. The second configuration can include same information with the first configuration, and the pre-defined second rules can be determined in a same way with method 300.

At block 903, the sensing device controls its communication device to receive operation parameters and commands from a device outside the aggregation and relays the operation information and commands to the rest of the aggregation, upon a condition that the function group to which the sensing device belongs is the master function group. In at least one embodiment, the device outside the aggregation can be a server.

At block 904, the sensing device controls its communication device to receive operation parameters and commands from a master sensing device of the master function group of the aggregation, upon a condition that the function group to which the sensing device belongs is a slave function group.

Figure 10:
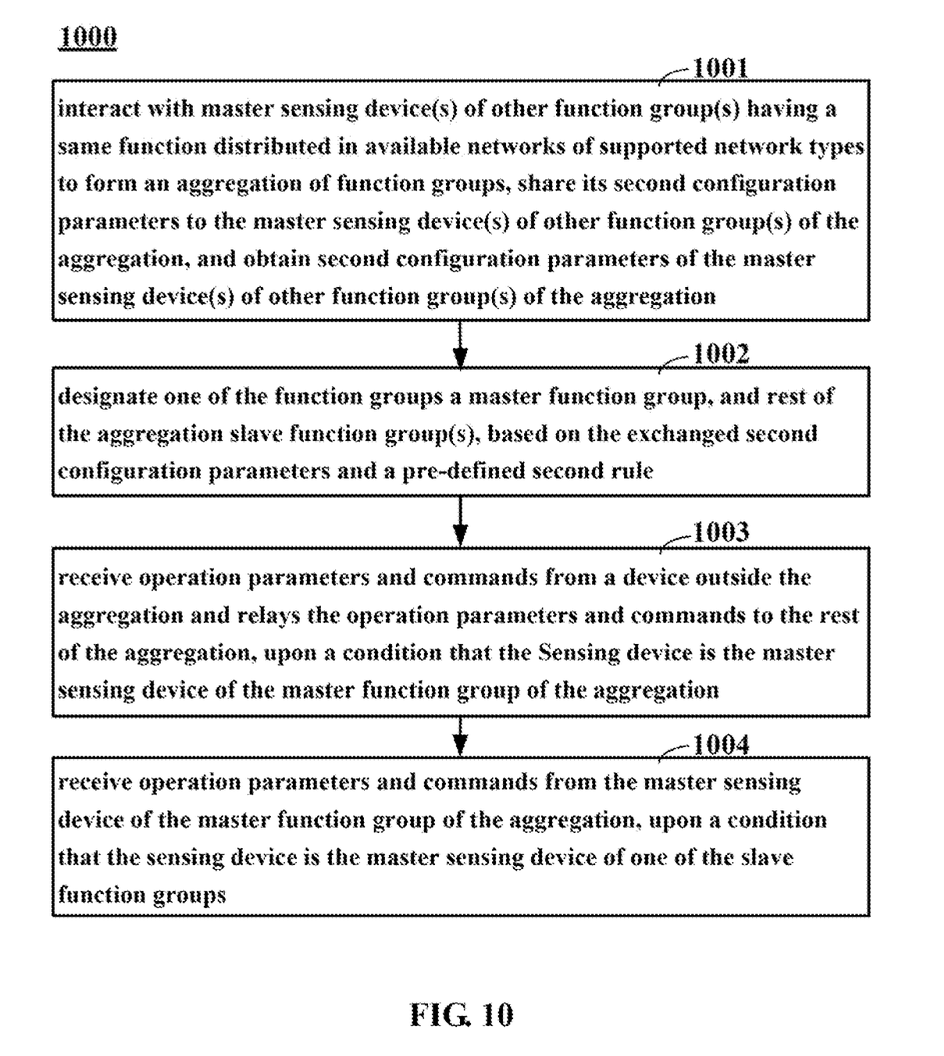
FIG. 10 is a flowchart of another exemplary embodiment of an aggregating method.

Referring to FIG. 10, a flowchart of another exemplary embodiment of an aggregating method is illustrated. The example method 1000 is provided by way of example, as there are a variety of ways to carry out the method. The method 1000 described below can be carried out using the configurations illustrated in FIGS. 1-2, 4-6, 8, for example, and various elements of the figures is referenced in explaining example method 1000. Each block shown in FIG. 1000 represents one or more processes, methods or subroutines, carried out in the exemplary method 1000. Furthermore, the illustrated order of blocks is by example only and the order of the blocks can change according to the present disclosure. Additional blocks may be added or fewer blocks may be utilized, without departing from this disclosure. The exemplary aggregating method 1000 is illustrated in FIG. 10. The exemplary method 1000 can be executed by one or more master sensing devices of one or more function groups and can begin at block 1001. Each master sensing device can include a sensor configured to sense related information, a communication device configured to communicate with other sensing devices and/or outside devices, and storage configured to store its configuration parameters, sensing function, and supported network types.

At block 1001, each master sensing device interacts with master sensing device(s) of other function group(s) having a same function distributed in available networks of supported network types to form an aggregation of function groups by grouping the function groups having the same sensing function in available networks of supported network types, shares its second configuration parameters to the master sensing device(s) of other function group(s) of the aggregation, and obtains second configuration parameters of the master sensing device(s) of other function group(s) of the aggregation.

At block 1002, each master sensing device designates one of the function groups a master function group, and rest of the aggregation slave function group(s), based on the exchanged second configuration parameters and a pre-defined second rule. The second configuration parameters can include same information with the first configuration parameters, and the pre-defined second rules can be determined in a same way as in method 300.

At block 1003, the master sensing device controls its communication device to receive operation parameters and commands from a device outside the aggregation and relays the operation information and commands to the master sensing devices of rest function groups of the aggregation, upon a condition that the master sending device is the master sending device of the master function group.

At block 1004, the master sensing device controls its communication device to receive operation parameters and commands from the master sensing device of the master function group of the aggregation, upon a condition that the master sensing device is the master sensing device of one of the slave function groups.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. A sensing device comprising:
    at least one central processing unit (CPU);
    at least one storage unit coupled to the CPU configured to store the sensing device's sensing function and supported network types;
    a sensor coupled to the CPU;
    a communication device controlled by the CPU; and
    a grouping system stored in the storage unit, the grouping system comprising a plurality of modules executable by the CPU to cause the CPU to:
        inquire the sensing device's sensing function, supported network types stored in the storage;
        interact with one or more sensing devices in networks of the supported network types, share the sensing function with the one or more sensing devices, and acquire the one or more sensing devices' sensing functions;
        form a function group by grouping the sensing device with at least one of the one or more sensing devices that have the same sensing function as the sensing device's sensing function based on a pre-defined first rule and through interaction with the one or more sensing devices, and exchange first configuration parameters of the sensing device with other sensing devices within the function group;
        designate one of the sensing devices of the function group as a master sensing device, and the rest of the group as slave sensing device(s), based on the exchanged first configuration parameters and a pre-defined second rule; and
        control the communication device to receive operation parameters and commands from a device outside the function group and relay the operation parameters and commands to the rest of the function group, upon a condition that the sensing device is the master sensing device;
    wherein the pre-defined first rule comprises: when the sensing devices having the same sensing function are distributed in two or more networks of the supported types, choosing those in a network with lower energy consumption, shorter distance and better network route to form the function group.

2. The sensing device of claim 1, wherein, upon a condition that the sensing device is the master sensing device of the function group, the plurality of modules are executable by the CPU to further cause the CPU to:
    exchange second configuration parameters with one or more master sensing devices of one or more function groups having sensing devices with the same sensing function and in networks of different types;
    form an aggregation of function groups comprising all of the function groups, through interaction with the one or more master sensing devices, based on the exchanged second configuration parameters and the pre-defined second rule, designate one of the function groups as a master function group of the aggregation, and the rest of the function groups as slave function group(s) of the aggregation;
    control the communication device to receive operation parameters and commands from a device outside the aggregation, and relay the operation parameters and commands to the slave sensing devices of the aggregation, upon a condition that the sensing device is the master sensing device of the master function group of the aggregation; and
    control the communication device to receive operation parameters and commands from the master sensing device of the aggregation, upon a condition that the sensing device is the master sensing device of one of the slave function group(s) of the aggregation.

3. The sensing device of claim 1, wherein the plurality of modules are executable by the CPU to further cause the CPU to, according to received commands, control the sensing device into a sleep mode or awake the sensing device from the sleep mode.

4. The sensing device of claim 1, wherein, when the master sensing device is in a sleep mode or not longer part of the function group, one or more other sensing devices join the function group or one or more sensing devices of the group are awakened from the sleep mode, the plurality of modules executable by the CPU to further cause the CPU to, re-group current available sensing devices and designate one of the available sensing devices as master sensing device according to the pre-defined second rule.

5. The sensing device of claim 1, wherein the first configuration parameters comprise identifiers for the sensing devices; and the pre-defined second rule comprises:
    designating the one of the sensing devices with the lowest sequence number in its identifier as the master sensing device.

6. The sensing device of claim 1, wherein the first configuration parameters comprise processing capabilities of processors of the sensing devices; and the pre-defined second rule comprises: designating the one of the sensing devices with the highest processing capability as the master sensing device.

7. The sensing device of claim 1, wherein the plurality of modules are executable by the CPU to further cause the CPU to set operation parameters of the sensor according to the received operation parameters, operate the sensor according to the commands, and control the communication device to send sensed information by the sensor to a server.

8. The sensing device of claim 7, wherein, upon a condition that the sensing device is the master sensing device of the function group, the plurality of modules are executable by the CPU to further cause the CPU to control the communication device to receive an analysis result of the sensed information from the server, and to control a display device to display the analysis result.

9. The sensing device of claim 7, wherein the operation parameters of the sensor comprise a sensing range, a working frequency, and start conditions.

10. A grouping method for a sensing device, wherein the sensing device comprises a sensor, at least one processor, at least one storage connected with the processor and a communication device controlled by the processor, the storage being configured to store the sensing device's sensing function, and supported network types, the method comprising:

inquiring the sensing device's sensing function and supported network types;

exchanging the sensing function and the supported network types with other sensing devices having a same sensing function and in networks of same supported network types with the sensing device;

forming a function group by grouping those of the sensing devices based on a pre-defined first rule, and exchanging first configuration parameters of the sensing devices within the function group;

designating one of the sensing devices of the function group as a master sensing device, and the rest of the group as slave sensing device(s), based on the exchanged first configuration parameters and a pre-defined second rule; and controlling the master sensing device's communication device to receive operation parameters and commands from a device outside the function group and relaying the operation parameters and commands to the rest of the function group;

wherein the pre-defined first rule comprises: when the sensing devices having the same sensing function are distributed in two or more networks of the supported types, choosing those in a network with lower energy consumption, shorter distance and better network route to form the function group.

11. The grouping method of claim 10, further comprising:

exchanging second configuration parameters with one or more master sensing devices of one or more function groups of sensing devices with the same sensing function and in networks of different types;

forming an aggregation of function groups comprising the function groups, through interaction with the one or more master sensing devices, based on the exchanged second configuration parameters and the pre-defined second rule;

designating one of the function groups as a master function group of the aggregation, and the rest of the function group(s) of the function groups in the aggregation as slave function group(s) of the aggregation; and controlling the master sensing device of the aggregation to receive operation parameters and commands from a device outside the aggregation, and relaying the operation parameters and commands to the slave sensing devices of the aggregation.

12. The grouping method of claim 10, further comprising: according to received commands, controlling the sensing device into a sleep mode or awake the sensing device from the sleep mode.

13. The grouping method of claim 10, further comprising: when the master sensing device is in a sleep mode or not longer part of the group, one or more other sensing devices join the group or one or more sensing devices of the group are awakened from the sleep mode, re-grouping current available sensing devices and designate one of the available sensing devices as master sensing device according to the pre-defined second rule.

14. The grouping method of claim 10, wherein the first configuration parameters comprise identifiers for the sensing devices; and the pre-defined second rule comprises: designating the one of the sensing devices with the lowest sequence number in its identifier as the master sensing device.

15. The grouping method of claim 10, wherein the first configuration parameters comprise processing capabilities of processors of the sensing devices; and the pre-defined second rule comprises: designating the one of the sensing devices with the highest processing capability as the master sensing device.

16. The grouping method of claim 10, further comprising: setting operation parameters of the sensor according to the received operation parameters, operating the sensor according to the commands, and controlling the communication device to send sensed information by the sensor to a server.

17. The grouping method of claim 16, further comprising: controlling the communication device to receive an analysis result of the sensed information from the server, and displaying the analysis result, upon a condition that the sensing device is the master sensing device of the function group.

18. The grouping method of claim 16, wherein the operation parameters of the sensor comprise a sensing range, a working frequency, and start conditions.

* * * * *